(12) United States Patent
Carli

(10) Patent No.: US 9,428,248 B2
(45) Date of Patent: Aug. 30, 2016

(54) BOAT

(71) Applicant: SAN MARCO S.N.C. DI CARLI MAURIZIO & C., Cattolica (IT)

(72) Inventor: Maurizio Carli, Gabicce Mare (IT)

(73) Assignee: SAN MARCO S.N.C. DI CARLI MAURIZIO & C., Cattolica RN (IT)

( * ) Notice: Subject to any disclaimer, the term of this patent is extended or adjusted under 35 U.S.C. 154(b) by 0 days.

(21) Appl. No.: 14/434,307

(22) PCT Filed: Oct. 10, 2013

(86) PCT No.: PCT/IT2013/000277
§ 371 (c)(1),
(2) Date: Apr. 8, 2015

(87) PCT Pub. No.: WO2014/057510
PCT Pub. Date: Apr. 17, 2014

(65) Prior Publication Data
US 2015/0259035 A1    Sep. 17, 2015

(30) Foreign Application Priority Data

Oct. 10, 2012 (IT) .............................. GE2012A0100

(51) Int. Cl.
| B63H 5/20 | (2006.01) |
| B63B 1/38 | (2006.01) |
| B63H 5/16 | (2006.01) |
| B63H 5/125 | (2006.01) |
| B63H 21/38 | (2006.01) |
| B63H 1/18 | (2006.01) |

(52) U.S. Cl.
CPC ................. *B63B 1/38* (2013.01); *B63H 5/125* (2013.01); *B63H 5/16* (2013.01); *B63H 21/38* (2013.01); *B63H 2001/185* (2013.01); *Y02T 70/122* (2013.01)

(58) Field of Classification Search
USPC .................................................. 114/289, 290
IPC ................. B63B 1/38; B63H 5/125,5/16, 21/38
See application file for complete search history.

(56) References Cited

U.S. PATENT DOCUMENTS 1,121,006 A * 12/1914 Fauber ...................... B63B 1/38
                                                                  114/289

FOREIGN PATENT DOCUMENTS

| AU | 523112 B2 * | 7/1982 | ............... B63B 1/38 |
| GB | 2344332 | * 6/2000 | ............... B63B 1/38 |

* cited by examiner

*Primary Examiner* — Stephen Avila
(74) *Attorney, Agent, or Firm* — Neifeld IP Law, PC

(57) ABSTRACT

A boat comprising a hull (10) and a propulsion means (3) suitably coupled to an inboard drive means (8), characterized in that said hull (10) is provided with at least one hollow (2) suitably shaped to at least partially accommodate said propulsion means (3), said hollow (2) being provided with at least one tube (21) and at least one atmospheric-pressure air intake (220) in such a way that the propulsion means, that is a surface propeller (3), can continuously operate under optimal conditions with respect to the thus-generated artificial water surface.

15 Claims, 3 Drawing Sheets

BOAT

CROSS REFERENCE TO RELATED APPLICATIONS

This application is a national stage entry of PCT/IT2013/000277, filed Oct. 10, 2013, which published as WO2014/057510 on Apr. 17, 2014, which claims priority to IT Application No. GE2012A000100, filed Oct. 10, 2012.

FIELD OF THE INVENTION

The present invention relates to a boat, and particularly to boats equipped with engine propulsion means.

STATE OF THE ART OF THE INVENTION

Currently, several approaches are used to reduce the resistance to the advancement of boats, such as investigating the aerodynamic profile of the hull in order to reduce the friction thereof against water, or determining the hydrodynamic behaviour of the propulsion means in order to make their behaviour in water the most efficient as possible.

Different inboard transmission/propulsion systems have been also investigated and introduced which employ various propulsion means, such as propulsion propellers, impellers or paddle wheels, intended to exploit the thrust provided by the acceleration of a fluid, in this case water, in order to move the boat.

Among the conventionally used inboard transmission/propulsion systems there are: systems with traditional submerged shafts, systems with traditional inboard/outboard stern assemblies, systems with water-jet assemblies, surface propulsion systems, systems with inboard/outboard IPS (Inboard Performance System) assemblies, and systems with inboard/outboard POD (Propulsion Drive Optimization) assemblies.

A propulsion system provided with a traditional submerged shaft is the most widespread and reliable, but it requires precision in aligning and using a number of members.

In some cases, the traditional engine-shaft coupling leads to problems of weight distribution because the engine is positioned too forward with respect to the hull, and this is especially true with boats designed for high speeds.

Even in deep waters, resistance to advancement is high due to the friction of submerged appendages whose resistance increases with the square of speed, thereby reducing the pitch angle and consequently increasing the wet surface.

The shaft and its support, which are positioned in front of the propulsion propeller, interact with the flow of water passing through the upper portion of the propeller and, when at high speeds, they generate air bubbles and cavitation which cause vibration and decrease the efficiency of the propulsion propeller.

Propulsion systems with traditional inboard/outboard assemblies (such as the Z-drive system, a type of marine propulsion system, particularly an azimuth propulsion system) are installed at the transom and coupled with inboard engines.

The propulsion propeller is completely submerged, and movement is transmitted by two pairs of conical gears at an angle of 90° which allow the propulsion propeller to operate without being tilted with respect to the free flow of water, said pairs of conical gears also enabling the use of support appendices which are well tapered and connected with the hub of the propeller; this results in power losses whenever the direction of the transmission is changed on one hand, and a good thrusting yield compared to the conventional system on the other hand.

However, there are problems related to friction of appendices and exposure of mechanical parts of the transmission to salt-containing contamination which increase corrosion and wear thereof.

Propulsion systems with water-jet assemblies make use of a pump accommodated within a hollow formed in the hull. The thrust is generated by an impeller which sucks water from a tube and then accelerate and expel it out.

The problems of this solution relate to the path of the water, which travels through the suction-discharge loop a plurality of times thereby increasing the losses, and the water sucked by the impeller generates a squeezing force which further hinders the advancement of the boat.

In a surface propulsion system, the propulsion propeller operates on the water surface, and optimal operating conditions are achieved when the propulsion propeller disk is submerged to one half its diameter into the gliding stream under maximal thrusting conditions.

This system does not show neither turbulence in front of the submerged half of the disk nor cyclical changes in the pitch angle of the propulsion propeller, as one half of the disk is operating out of the water; this results in an optimal efficiency.

The problems include poor steering abilities in reverse running.

Furthermore, the application of this system is inappropriate and poorly effective for boats of length less than 11 meters and with speeds below 40 knots because said boats tend to pitch under these conditions, leading to cavitation of the propulsion propeller.

A propulsion system with inboard/outboard IPS assemblies (Volvo Penta) is characterized by pulling propulsion propellers counter-rotating about the same axis and by an inboard engine. Transmission occurs through two pairs of conical gears at an angle of 90° which allows the direction of transmission to be rotated by approximately 180°. This system allows the propulsion propeller to operate under optimal conditions and without turbulence, thereby achieving a reduced vibration, a maximal thrust as well as a good governance.

However, these propulsion propellers suffers from problems of friction both in the area behind the flow of the propeller and at the static appendages of the boat, which are tapered but bulky as they have to accommodate the driven gears. Furthermore, this system is vulnerable to potential impacts with submerged or partially submerged objects which could be caught either between the propellers or between the propeller and the keel of the hull, thereby causing serious damage to the transmission and to the hull itself.

A propulsion system with inboard/outboard POD assemblies (ZF) includes transmission systems which are mounted to booms and coupled with inboard engines. Water-tight sealing is obtained by means of a reinforced membrane which prevent water from flowing into the bilge even in the case of impacts. The transmission is carried out by two pair of conical gears at an angle of 90° which dissipate power but allow the propulsion propeller to operate without being tilted with respect to the water flow by aligning the thrust towards the stern by means of completely submerged counter-rotating thrusting propellers. A problem is the friction of the appendices protecting the propellers from potential impacts.

These types of propulsion systems aim to reduce friction and cavitation in the area of the propulsion propeller or, as in the case of the water-jet systems in which the propulsion propeller is replaced with a pump, to improve the efficiency and power yield of the boat, to increase its steering ability in different see and seabed conditions, and to reduce corrosion and wear of its mechanical components.

OBJECT OF THE INVENTION

Accordingly, an aim of the present invention is to provide a boat characterized by a hull which can reduce resistance to advancement, consumption, vibration and friction losses of the boat.

Another aim is to provide a hull which can effectively cooperate with the propulsion means in order to reduce friction losses at the propulsion area of the boat.

Therefore, the object of the present invention is to provide a boat comprising a hull and propulsion means suitably coupled to inboard drive means, characterized in that said hull is provided with at least one hollow which is suitably shaped to at least partially accommodate said propulsion means, said hollow being provided with at least one atmospheric pressure-air intake, said air intake preferably communicating with the compartment of the hull in which said drive means is accommodated.

When the boat is travelling at cruising speed, the air intake allows the so-called Venturi effect to be exploited in order to compensate for the effect of air suction from the hollow caused by the water flowing under the hull, thereby allowing the propulsion means to be maintained in a suitable "air cushion" at a substantially constant pressure.

Advantageously, said hollow can be put in communication with a pressurized gaseous fluid, preferably coming from the engine exhaust, in order to maintain the hollow accommodating the propulsion means sufficiently free of water in the absence of the Venturi effect, and consequently in the absence of the effect brought about by the atmospheric-pressure air tube, however, under these operational conditions, means are required to prevent gas from flowing back through the atmospheric-pressure air tube, and this approach allow the boat to be easily controlled when in steering condition.

BRIEF DESCRIPTION OF THE DRAWINGS

These and other features of the invention, and the advantages derived therefrom, will become apparent from the following detailed description of a preferred embodiment thereof which is provided by way of a non-limiting example with reference to the accompanying drawings, in which.

DESCRIPTION OF CERTAIN EMBODIMENTS OF THE INVENTION

Figure 1:
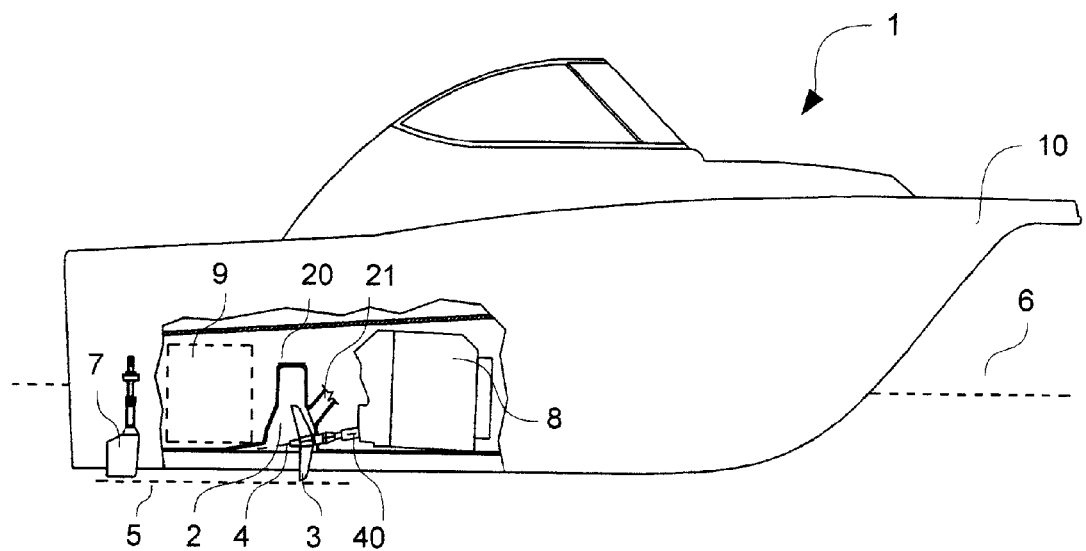
FIG. 1 is a side view of a boat according to the present invention with the propulsion means in a thrusting configuration.

FIG. 1 shows the boat according to the present invention, with the propulsion means arranged in a thrusting configuration.

The boat 1 comprises a hull 10, steering means 7, at least one engine means 8, a driven shaft 4, a propulsion means 3, a fuel tank 9, and support means 40.

Said hull 10 is characterized by a housing hollow 2 located at the rear portion of the hull 10, said housing hollow 2 being able to accommodate the propulsion means 3.

This housing hollow 2 is suitably shaped for accommodating said propulsion means 3 and, therefore, its shape and geometry are not standard as said shape and geometry will be related and proportioned to the type of application, the size of the propulsion means 3, the powers employed, the kind and sections of the hull 10; in a preferred embodiment, the housing hollow 2 should accommodate at least 50% of the volume of the surface propulsion means 3.

With reference to FIG. 1, said housing hollow 2 advantageously has both a height which is at least 30% greater than the maximum size value of the propulsion means 3 and a maximum width, with respect to the longitudinal vertical plane which is orthogonal to the theoretical waterline 6, which is at least 30% greater than the maximum size of the propulsion means 3.

Furthermore, said housing hollow 2 extends above the theoretical waterline 6 by at least 20% of its total height, and the top of the housing hollow is water-tightly closed by a door 20.

Said water-tight door 20 allows the housing hollow 2 to be inspected and the propulsion means 3 to be cleaned from fouling, algae or foreign bodies which are deposited when water is present in the hollow.

The arrangement of the different components can be inferred from the figure: the engine means 8 is positioned at the central portion of the hull 10, and it has operatively connected thereto the driven shaft 4 followed by the propulsion means 3, while the tank 9 is positioned at the rear portion or stern of said hull 10.

The propulsion means 3 is shown to be arranged in a thrusting configuration, and it is located within the housing hollow 2.

The driven shaft 4 is mounted in cantilever fashion and it does not need any additional support, thereby facilitating the maintenance and cleaning of the propulsion means 3.

Figure 3:
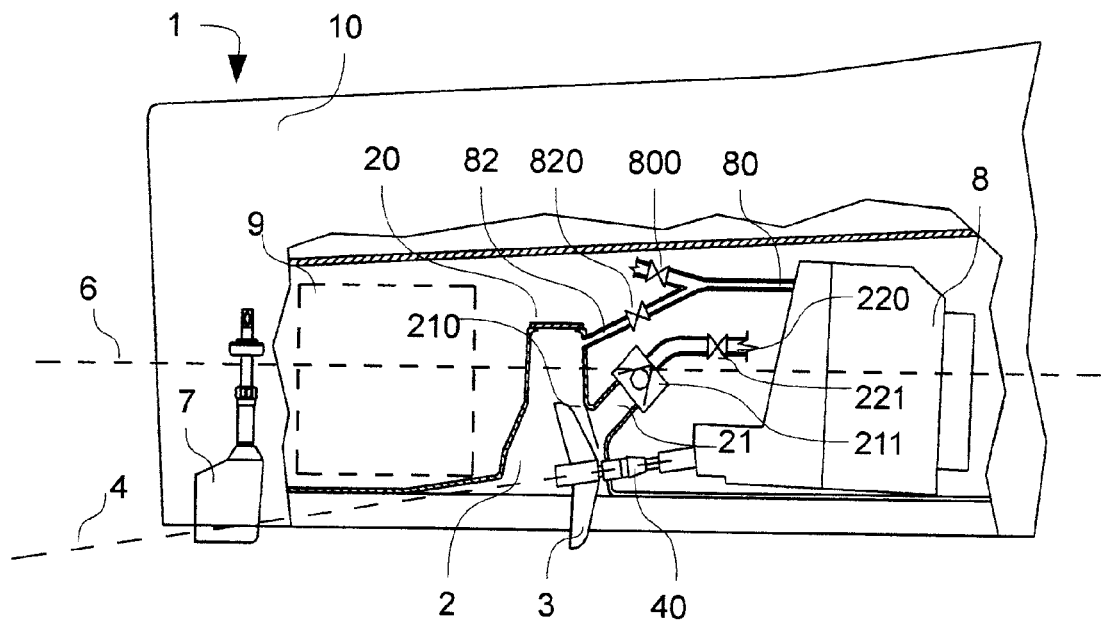
FIG. 3 is a longitudinal sectional detail of the stern of the boat as depicted in FIG. 1.

As best shown in FIG. 3, said housing hollow 2 has at least one tube 21 provided with an air intake 220 for supplying air at atmospheric pressure, said tube 21 being also advantageously provided with non-return means, such as non-return valves 211, an interception valve 221 and a deflector 210, to prevent water and gas from flowing back into the hull.

In fact, the Venturi effect generated within the hollow 2 while the boat is advancing is exploited to automatically remove water from said housing hollow 2 in order to bring water to a level flush with the fluid streamlines passing along the bottom of the keel, thereby allowing the propulsion means 3 to operate under optimal conditions because the depression formed within the hollow 2 by the flowing-out water is counterbalanced by the air flowing through the tube 21.

Indeed, one half of said propulsion means 3 operates in undisturbed water under semi-cavitation conditions so as to determine the thrusting work with strong lateral loads, while the other half operates in air so as to distribute the atmospheric-pressure air sucked from the suction tube 21 under the hull 10 as a film which reduces the friction resistance.

When the boat is travelling at cruising speed, the atmospheric-pressure air intake connected to the tube 21 allows the Venturi effect to be exploited in order to compensate for the effect of air suction from the hollow caused by the water flowing under the hull, thereby allowing the propulsion means 3 to be maintained in a suitable "air cushion" at a substantially constant pressure.

Moreover, from the figure, it can be inferred that the lower end of the rudder 7 is submerged at the same depth as the propeller and the construction line, taking the theoretical waterline 6 as a reference.

In fact, considering the submersion depth of the lower end of the propulsion means 3 as represented by a dashed line 5, it can be noted that the lower end of the rudder 7 is at the same submersion depth.

In a preferred embodiment, said propulsion means 3 comprises a surface propeller with at least three blades inclined at a rake angle (the rake angle is the inclination of the blade, defined as the angle formed by a straight line passing through the cross-section of the blade with respect to a plane perpendicular to the axis of the propeller) in the range from 0° to 12° depending on the applications, in order to optimize and align the thrusting force to the fluid streamlines of the hull 10.

The surface propellers are usually completely submerged under static set-up conditions, while they operate optimally under gliding set-up conditions.

The transition from one set-up to another is particularly difficult, so that the upper portion of the propeller disc was traditionally assisted with compressed air in order to create optimal gliding conditions during the transition from the static set-up to the gliding set-up.

Other approaches to suppress water resistance at the upper portion of the propeller disc, and to prevent an overload of the engine means, include making the exhaust gas flowing above a tunnel-type rudder (Sonny Levi Drive Unit system), or using open-sided tubes to convey the exhaust gas into the stern area, said open-sided tube being equipped with hinged flaps allowing the fluid streamlines to be aligned to the hub of the propeller (UK Patent Application GB2381514A), or employing variable set-up, variable direction surface transmissions which cooperate with a hydraulic piston to change the operative height of the propeller as a function of the speed and set-up of the hull. However, the hull characterized by the housing hollow 2 according to the present invention does not require said approaches because, as described above, it exploit the Venturi effect to reduce the time to bring said hull into the gliding set-up condition.

Figure 2:
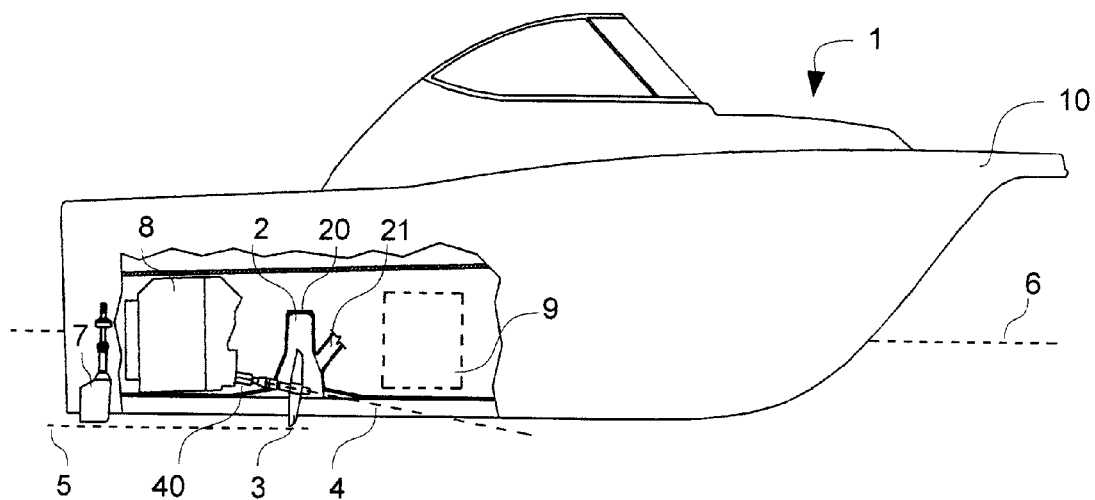
FIG. 2 is a side view of a boat according to the present invention with the propulsion means in a pulling configuration.

FIG. 2 is a side view of a boat according to the present invention, with the propulsion means in a pulling configuration.

The figure shows that the arrangement of the components is different compared to that in the thrusting configuration as shown in FIG. 1.

In fact, the tank 9 is located at the central portion of the hull 10, while the engine means 8 is positioned at the rear portion or stern of said hull 10.

This configuration can be applied whenever there are problems of space or weight distribution or for high-speed applications.

In fact, the use of the Venturi effect automatically removes water from said housing hollow 2 in order to bring water to a level flush with the fluid streamlines passing along the bottom of the keel, thereby achieving optimal operational conditions for the propulsion means 3.

Indeed, one half of said propulsion means 3 operates in undisturbed water under semi-cavitation conditions so as to determine the thrusting work with strong lateral loads, while the other half operates in air so as to distribute the atmospheric-pressure air sucked from the tube 21 under the hull 10 as a film which reduces the resistance thereof.

FIG. 3 is a detail of the stern of the boat depicted in FIG. 1.

FIG. 3 illustrates the propeller-housing hollow 2 comprising the tube 21 which sucks atmospheric-pressure air through the air intake 220 to bring it into and out from the hull compartment 10 of the engine room.

The hull 10 according to the present invention is characterized in that said housing hollow 2 is suitably shaped according to the geometry and characteristics of the propulsion means to be accommodated therein, in such a way that the active disk portion of said propulsion means protrudes from the hull.

From the figure it can be inferred that said housing hollow 2 extends above the theoretical waterline 6 by at least the volume required to accommodate the propulsion means and to allow the upper portion to be opened for inspection while preventing water from flowing in. In fact, the top of the housing hollow 2 is provided with a water-tight door 20 which allows the housing hollow 2 to be inspected and the propulsion means 3 to be cleaned from fouling, algae or foreign bodies which are deposited when water is present in the hollow.

Said air intake tube 21 located in the part connected to the hollow, without being reduced in air flow-rate cross-section, is protected by a deflector 210 which lowers the air flow sucked from the hollow to an appropriate height with respect to the hub of the propeller, and by non-return means 211 and an interception valve 221 to prevent the exhaust gas from flowing back into the engine room when in steering static conditions, the tube 21 being also connected to an atmospheric-pressure air intake 220.

Furthermore, said hollow 2 communicates with the engine exhaust 80 through the tube 82.

When the boat is travelling even slowly compared to the fluid, the atmospheric-pressure air intake 220 allows the Venturi effect to be exploited in order to compensate for the effect of air suction from the hollow caused by the water flowing under the hull, thereby allowing the propulsion means 3 to be maintained in a suitable "air cushion" at a substantially constant pressure.

As previously described and better illustrated herein, said housing hollow 2 has at least one tube 21 communicating with both the atmospheric-pressure air intake 220 and the engine exhaust 80.

Said engine exhaust 80 is provided with interception means 800 and at least one tube 82 which connects it to the hollow 2, said tube 82 being provided with suitable interception means 820.

Said tube 82 allows the exhaust gas to be supplied to the hollow 2 according to the running needs, especially during steering operations.

Furthermore, the exhaust gas flowing into the hollow 2 allows to improve the steering ability of the hull either in static conditions or in the absence of dynamic phenomenon as it allows the filling of said hollow 2 to be controlled and limited, in fact, the supply of gas can be manually or automatically managed by the interception means 820; 800; 221 which are activated according to the running regime of the engine.

Said tube 21 is advantageously provided with an atmospheric-pressure air intake 220, interception means 221 and deflection means 210 or other means adapted to prevent the exhaust gas passing from the exhaust 82 into the hollow 2 from flowing back into the suction tube 21 when in static condition.

The interception means 820 is actuated to put the engine exhaust 80 in communication with the tube 82 and the hollow 2 either when the boat is in a static condition or, preferably, in the absence of the dynamic phenomenon with the engine running at idle or in reverse, in such a way that the exhaust gas flowing into the hollow 2 can limit the filling of the hollow with water and clear the upper half of the propeller disc. In this condition, the tube 21 is closed by the interception means 221 in order to prevent gas from flowing back into the hull compartment 10. In fact, the Venturi effect generated within the hollow 2 while the boat is advancing is exploited to automatically remove water from said housing hollow 2 in order to bring water to a level flush with the fluid streamlines passing along the bottom of the keel, thereby allowing the propulsion means 3 to operate under optimal conditions because the depression formed within the hollow 2 by the flowing-out water is counterbalanced by the air flowing through the tube 21 or by the exhaust gas controllably supplied through the tube 82.

The embodiment illustrated in FIG. 3 includes only one support 40 for the driven shaft 4, which is mounted in cantilever fashion so as to facilitate the maintenance of the components.

Figure 4:
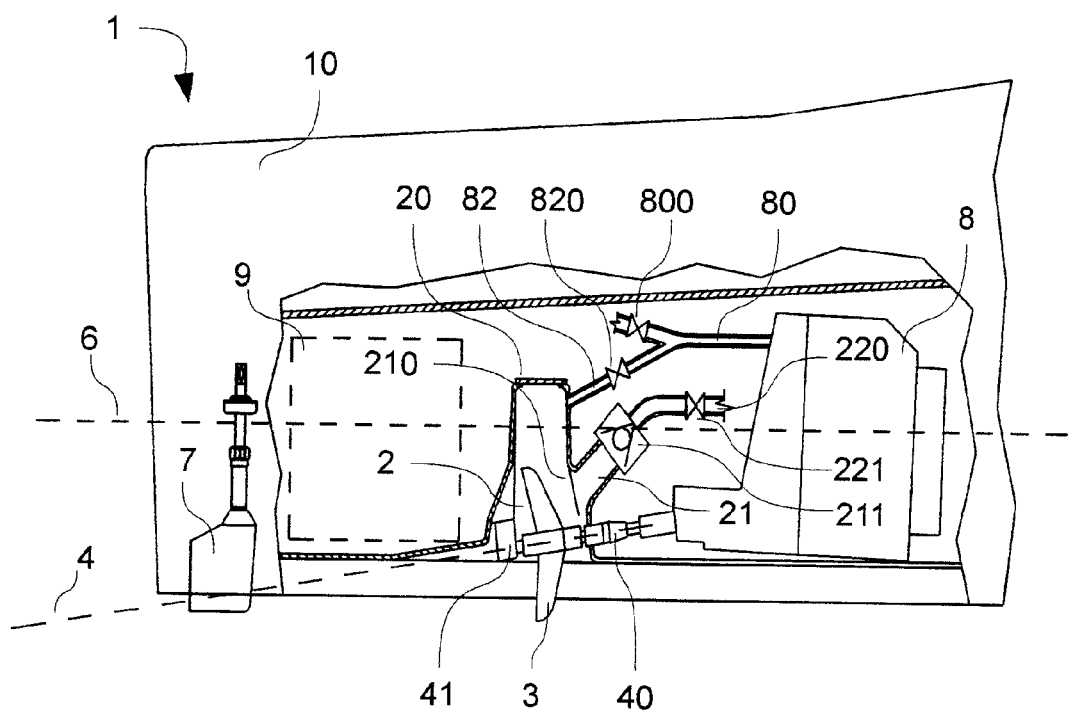
FIG. 4 is a side view of the structure depicted in FIG. 1, having a second support for the driven shaft.

FIG. 4 is a side view of the structure illustrated in FIG. 1, having a second support for the driven shaft.

In fact, the figure shows the engine means 8 which is operatively connected to the propulsion means 3 via the driven shaft 4, a first support 40 for the driven shaft 4, the propulsion means 3, and the second support 41 for said driven shaft 4.

Said support 41 for the driven shaft 4 is located behind the propulsion means 3, and it is attached to the hull 10 of the boat 1.

This approach is more complex than that described in FIG. 3, but it allows to resist the lateral load occurring in thrust conditions for surface applications while reducing vibration of the transmission means, thereby decreasing the wear thereof.

The second support 41 for the driven shaft 4 can also be applied when the propulsion means 3 is in the thrusting configuration as illustrated in FIG. 2, leading to the same advantages.

Figure 5:
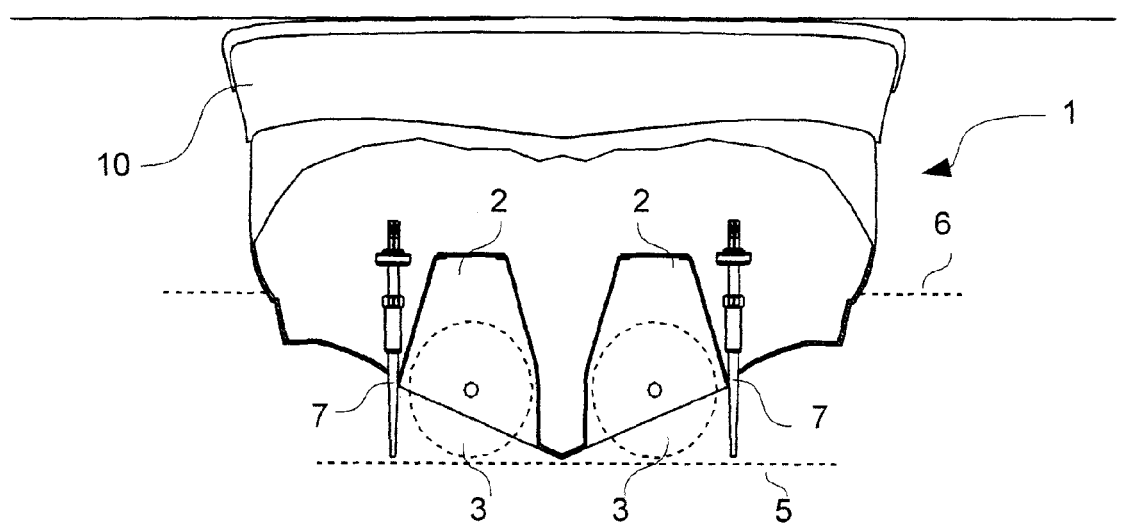
FIG. 5 is a sectional view of the stern of the boat according to the present invention as seen from behind.

FIG. 5 is a sectional view of the stern of the boat according to the present invention as seen from behind.

From the figure it can be inferred that each propulsion means 3 is accommodated in a corresponding housing hollow 2 which is suitably shaped to accommodate said propulsion means 3 and maximize the performance thereof.

With reference to FIG. 5, said housing hollow 2 advantageously has a maximum width, with respect to the transversal vertical plane which is orthogonal to the theoretical waterline 6, which is at least 15% greater than the maximum size value of the propulsion means 3.

Still with reference to this figure, it can be inferred that the rudder 7 is positioned in such a way as to be parallel and tangent to the fluid streamlines exiting from the propulsion means 3.

Advantageously, the steering means include two rudders 7, but it is contemplated that one rudder 7 can be used, said one rudder being submerged below the waterline and located at the centre symmetrically with respect to the two propulsion means 3; such a choice of equipment cannot exploit the advantage of shallow draft.

Moreover, from the figure, it can be inferred that the lower end of the rudder 7 is submerged at the same depth as the propeller.

In fact, considering the submersion depth of the lower end of the propulsion means 3 as represented by a dashed line 5, it can be noted that the lower end of the rudder 7 is at the same submersion depth, resulting in a significant advantage in the case of collision with a shallow seabed or with buoyant objects which are partially submerged.

FIG. 5 shows an embodiment comprising two engines to compensate for the lateral thrust component generated by the two propulsion means 3; in fact, the propulsion means 3 rotate in opposite directions, thereby mutually suppressing the lateral thrust generated by each of them.

Moreover, compared to other approaches and applications, the double-engine version illustrated in the figure has a submersion depth of the propulsion means 3 which is extremely reduced, i.e. a few centimeters beyond the bottom of the hull 10; this is advantageous in the case of collision with a shallow seabed or with buoyant objects which are partially submerged.

The hull 10 according to the present invention, which is characterized by a housing hollow 2, allows for the use of propulsion means comprising propellers in surface propulsion systems even on boats less than 11 meters in length, without experimenting the problem of cavitation of the propeller due to the dolphin-like set-up.

Indeed, the housing hollow 2 cooperates with the propulsion means 3 to prevent pitching from causing cavitation, so that the system is also suitable for boats defined in jargon as "short", i.e. less than ten meters in length.

Furthermore, as previously described, the hull according to the present invention is extremely flexible and lends itself to various applications, either with the engine at the centre of the boat and the hollow substantially at the middle of the keel, or with the engine at the stern and the hollow arranged near the transom when in thrusting configuration, or with the engine at the stern and the hollow substantially at the middle of the keel, thus avoiding the use of the V-drive approach, which is more cumbersome and expensive, as well as allowing pre-existing and in-use gliding keels to be reconverted.

The invention claimed is:

1. A boat comprising a hull (10) and a propulsion means (3) suitably coupled to an inboard drive means (8), wherein said hull (10) is provided with at least one hollow (2), said hollow (2) having an opening below the waterline height (6) of the hull and below the bottom of the keel of the hull (10), said hollow (2) is further suitably shaped to at least partially accommodate said propulsion means (3) and is provided with at least one atmospheric-pressure air intake (220), characterized in that the Venturi effect generated within said housing hollow (2) while the boat is advancing is exploited to automatically remove water from said housing hollow (2) in order to bring water to a level flush with the fluid streamlines passing along the bottom of the keel because the depression formed within the hollow (2) by the flowing-out water is counterbalanced by the air flowing through the tube (21) or by the exhaust gas controllably supplied in loop through the tube (82).

2. The boat according to claim 1, wherein the propulsion means (3) comprises a surface piercing propeller (3) whose running set-up is always maintained constant regardless of rolling and pitching, thereby maintaining constant the performance thereof.

3. The boat according to claim 1, wherein said air intake tube (21) is completely free of flow-rate constrictions throughout its entire extension, and it preferably communicates with the hull compartment (10) in which the drive means is accommodated.

4. The boat according to claim 2, wherein said drive means comprises an at least internal-combustion engine means (8).

5. The boat according to claim 4, wherein said internal-combustion engine means (8) comprises an engine exhaust (80) provided with interception means (800) and at least one tube (82) which connects it to said hollow (2), said tube (82) being provided with suitable interception means (820).

6. The boat according to claim 1, wherein said housing hollow (2) communicates with the atmospheric-pressure air intake via an appropriate tube (21) provided with non-return means (211), interception means (221) and deflection means (210) or other means adapted to prevent exhaust gas passing from the exhaust (82) into the hollow (2) from flowing back into the suction tube (21) when in static condition.

7. The boat according to claim 1, wherein said housing hollow (2) can contain the propulsion means (3) at least up to the hub thereof.

8. The boat according to claim 1, wherein on the stern in the applications external with respect to the hull, the top of said hollow (2) has an opening (20) which remains in a fixed open status in atmosphere with a deflector angled of 45° facing the trail of the hull (10) to facilitate the washing water raised by the surface piercing propeller at low revolutions.

9. The boat according to claim 1, wherein said housing hollow (2) has a maximum width, with respect to the transversal vertical plane which is orthogonal to the theoretical waterline (6), corresponding to the maximum size value of the propulsion means (3) plus at least 15 percent.

10. The boat according to claim 1, wherein the axis (4), onto which the surface piercing propeller (3) is keyed, is housed inside the hollow (2) and is supported by two supports (40,41) straddling the surface piercing propeller (3).

11. The boat according to claim 1, wherein the engine is positioned at the centre of the boat and the hollow (2) is substantially at the middle of the keel.

12. The boat according to claim 1, wherein the engine is positioned at the stern and the hollow (2) is arranged near the transom when the hull (10) is in thrusting configuration.

13. The boat according to claim 1, wherein baffle means (72,73) are positioned in the proximity of the propulsion means (3) and are fixed to said shell (10) in a removable manner.

14. The boat according to claim 13, wherein said baffle means (72,73) partially obstruct said hollow (2) generating an open communication channel (22) between the hollow (2) and the aperture (32).

15. The boat according to claim 1, wherein said baffle means (72; 73) regularize the fluid streamlines entering and outputting the propulsion means (3).

* * * * *